(12) United States Patent
Pilkington et al.

(10) Patent No.: US 10,627,232 B2
(45) Date of Patent: Apr. 21, 2020

(54) METHOD AND SYSTEM FOR AERIAL IMAGE PROCESSING

(71) Applicant: Infatics, Inc., San Francisco, CA (US)

(72) Inventors: Nicholas Pilkington, San Francisco, CA (US); Jonathan James Millin, San Francisco, CA (US)

(73) Assignee: Infatics, Inc., San Francisco, CA (US)

( * ) Notice: Subject to any disclaimer, the term of this patent is extended or adjusted under 35 U.S.C. 154(b) by 2 days.

(21) Appl. No.: 16/020,441

(22) Filed: Jun. 27, 2018

(65) Prior Publication Data

US 2018/0372493 A1    Dec. 27, 2018

Related U.S. Application Data

(60) Provisional application No. 62/525,509, filed on Jun. 27, 2017.

(51) Int. Cl.
*G01C 11/04* (2006.01)
*G06T 7/73* (2017.01)

(52) U.S. Cl.
CPC .......... *G01C 11/04* (2013.01); *G06T 7/73* (2017.01); *G06T 2207/10032* (2013.01); *G06T 2207/20084* (2013.01); *G06T 2207/30181* (2013.01)

(58) Field of Classification Search
CPC . G01C 11/04; G06T 7/73; G06T 2207/10032; G06T 2207/20084; G06T 2207/3081
See application file for complete search history.

(56) References Cited

U.S. PATENT DOCUMENTS

| | | |
|---|---|---|
| 2006/0239537 A1 | 10/2006 | Shragai et al. |
| 2009/0003691 A1 | 1/2009 | Padfield et al. |
| 2009/0110241 A1 | 4/2009 | Takemoto et al. |
| 2011/0064312 A1* | 3/2011 | Janky .............. G01C 15/00 382/195 |
| 2014/0219514 A1 | 8/2014 | Johnston et al. |
| 2014/0316616 A1 | 10/2014 | Kugelmass |
| 2015/0009206 A1 | 1/2015 | Arendash et al. |
| 2015/0036888 A1 | 2/2015 | Weisenburger |
| 2015/0226575 A1 | 8/2015 | Rambo |
| 2015/0243073 A1 | 8/2015 | Chen et al. |
| 2015/0336671 A1 | 11/2015 | Winn et al. |

(Continued)

OTHER PUBLICATIONS

Skaloud et al., Exterior Orientation by Direct Measurement of Camera Position and Attitude, 1996, International Archives of Photogrammetry, (ISPRS), vol. XXXI, Part B3, pp. 125-130.*

(Continued)

*Primary Examiner* — Sujoy K Kundu
*Assistant Examiner* — L. Anderson
(74) *Attorney, Agent, or Firm* — Jeffrey Schox; Diana Lin

(57) ABSTRACT

A method for aerial image processing preferably includes receiving ground control point (GCP) information, receiving a set of images, determining spatial information associated with the images, and determining GCP image locations; and can additionally or alternatively include determining aerial map information, training an automated GCP detector, and/or any other suitable elements. A system for aerial image processing preferably includes one or more computing devices, and can additionally or alternatively include one or more GCPs, aerial vehicles, and/or any other suitable elements.

12 Claims, 7 Drawing Sheets

(56) References Cited

U.S. PATENT DOCUMENTS

| | | |
|---|---|---|
| 2016/0046373 A1 | 2/2016 | Kugelmass |
| 2016/0046374 A1 | 2/2016 | Kugelmass |
| 2016/0150142 A1 | 5/2016 | Lapstun et al. |
| 2017/0012697 A1 | 1/2017 | Gong et al. |
| 2017/0084037 A1* | 3/2017 | Barajas Hernandez ............... G06K 9/4671 |
| 2017/0109577 A1* | 4/2017 | Wang ................. G06K 9/00476 |
| 2017/0178358 A1* | 6/2017 | Greveson ........... G06K 9/00476 |
| 2018/0356492 A1 | 12/2018 | Hamilton |
| 2019/0026919 A1 | 1/2019 | Aratani |
| 2019/0155302 A1* | 5/2019 | Lukierski ................ G06T 17/00 |

OTHER PUBLICATIONS

Chapter 10 Principles of Photogrammetry, Mar. 31, 1993, https://www.lpl.ariaona.edu/hamilton/sites/pl.arizona.edu.hamilton/files/courses/ptys551/Principles_of_Photogrammetry.pdf, pp. 10-1-10-19.*

Ciresan et al., Multi-column Deep Neural Networks for Image Classification, Mar. 28, 2012, pp. 1-8.*

* cited by examiner

METHOD AND SYSTEM FOR AERIAL IMAGE PROCESSING

CROSS-REFERENCE TO RELATED APPLICATIONS

This application claims the benefit of U.S. Provisional Application Ser. No. 62/525,509, filed on 27 Jun. 2017, which is incorporated in its entirety by this reference.

TECHNICAL FIELD

This invention relates generally to the image processing field, and more specifically to a new and useful method and system for aerial image processing in the image processing field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
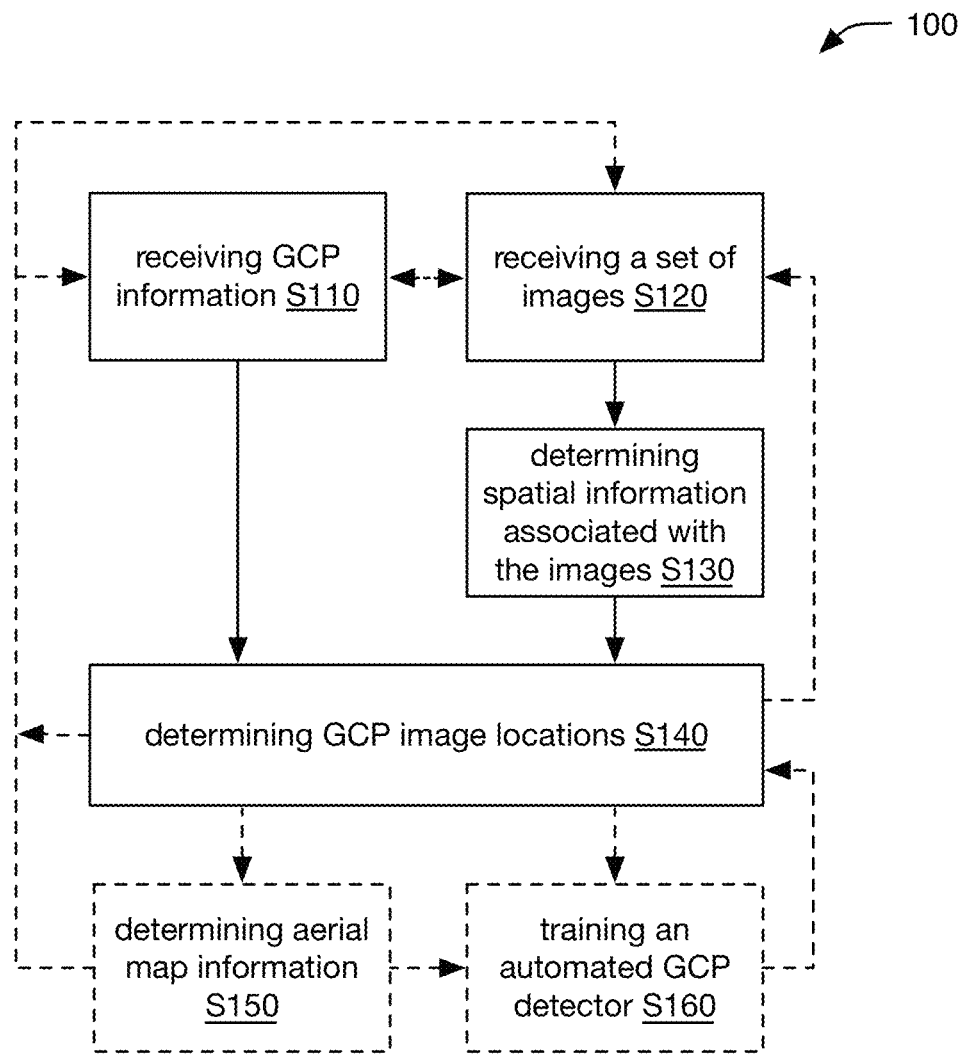
FIG. 1 is a flowchart diagram of an embodiment of the method for aerial image processing.

A method 100 for aerial image processing preferably includes receiving ground control point (GCP) information S110, receiving a set of images S120, determining spatial information associated with the images S130, and determining GCP image locations S140; and can optionally include determining aerial map information S150, training an automated GCP detector S160, and/or any other suitable elements (e.g., as shown in FIG. 1). The method 100 preferably functions to facilitate incorporation of GCPs into aerial maps (e.g., photograms, spatial models, etc.). In one example, variants of the method 100 function to refine the camera parameters (e.g., extrinsic parameters, camera pose estimates, etc.).

In one variation, the method includes: receiving a set of images of a mapping region captured by a set of cameras, each image associated with a respective camera pose estimate; refining the camera pose estimates based on the set of images; receiving a GCP dataset associated with the mapping region; and further refining the (already refined) camera pose estimates using the relationship between the GCP dataset and the GCPs represented in the set of images. The refined camera pose estimates can then be used to generate maps and/or analyses of the mapping region (e.g., orthomaps), and/or otherwise used. However, the method can be otherwise performed.

The method 100 is preferably implemented using a platform interfaced with one or more aerial vehicles, more preferably unmanned aerial vehicles (UAVs), and operable to provide services in relation to one or more of: UAV mission preparation, UAV mission execution, UAV mission modification, aerial image data analysis, aerial video data analysis, analysis of sensor data from aerial systems, aerial telemetry analysis, and/or any other suitable type of UAV-related service. The platform can include, for example, one or more computing devices (e.g., remote computing systems, such as internet-connected servers; user devices, such as smartphones, tablets, computers, and/or any other suitable personal computing devices; etc.). The method(s) 100 can thus be implemented using one or more system elements described in U.S. application Ser. No. 14/717,955 filed on 20 May 2015 and titled "Method for Adaptive Mission Execution on an Unmanned Aerial Vehicle" and/or U.S. application Ser. No. 14/844,841 filed on 3 Sep. 2015 and titled "System and Methods for Hosting Missions with Unmanned Aerial Vehicles" which are each incorporated in its entirety by this reference. For example, the method 100 can be implemented using one or more UAVs that include system elements such as image sensors (e.g., cameras) and/or spatial sensors (e.g., GNSS and/or other geopositioning modules, such as receivers for one or more of GPS, GLONASS, BeiDou, Galileo, etc., optionally including correction modules such as RTK and/or PPK correction modules; inertial measurement units (IMUs), such as gyroscopes, accelerometers, and/or magnetometers; altimeters; etc.). However, the method 100 can additionally or alternatively be implemented using manned aerial vehicles, spacecraft (e.g., orbital vehicles such as satellites), and/or any other suitable system or system elements.

2. Method.

2.1 Receiving GCP Information.

Receiving GCP information S110 preferably functions to receive one or more GCP datasets that can be used to refine spatial analysis of a set of one or more images (e.g., including images that depict one or more of the GCPs). The GCP information preferably includes information associated with a set of one or more GCPs, preferably a plurality of GCPs (e.g., 3, 4, 5, 6, 7-10, or 10-20 GCPs, etc.) arranged within one or more mapping regions (e.g., regions to be mapped and/or otherwise documented, such as by aerial imagery).

The GCP information preferably includes (e.g., associated with each GCP) location information (e.g., GCP coordinates, such as latitude, longitude, and altitude; easting, northing, and altitude; etc.). For example, S110 can include receiving a GCP dataset associated with a mapping region, the GCP dataset comprising a set of geographic locations, each geographic location of the set associated with a respective GCP. Location information is preferably determined by a survey (e.g., survey of GCP positions within a mapping region), more preferably a precise survey, such as a survey determining the location information within a threshold accuracy (e.g., 20, 10, 5, 4, 3, 2, 1, 0.5, 0.2, 0.1, 0.05, 0.02, 0.01, 30-10, 10-3, 3-1, 1-0.3, 0.3-0.1, 0.1-0.03, or 0.03-0.01 m) but can alternatively have any suitable accuracy and/or be determined in any other suitable manner. The survey is preferably a GNSS-aided (e.g., GPS-aided) survey, more preferably including one or more correction techniques such as kinematic correction techniques (e.g., RTK GPS, PPK GPS, etc.), but can additionally or alternatively include any other suitable survey techniques.

The GCP information can additionally or alternatively include (e.g., associated with one or more of the GCPs) one or more GCP identifiers (e.g., name, number, icon, etc.; preferably associated with an identifying mark visible from above, such as depicted in aerial imagery of the GCP), GCP marker types (e.g., X, checked pattern, circle w/centermark, etc.), GCP setting (e.g., surrounding features such as background color, nearby landmarks and/or visually-identifiable features, etc.), and/or any other suitable information associated with the GCPs.

The GCP information is preferably received by one or more computing devices (e.g., remote computing system such as an internet-connected server, user device such as a personal computing device, etc.), but can additionally or alternatively be received by one or more aerial vehicles and/or any other suitable devices. The GCP information can be received from a user, survey provider, surveying equipment, and/or any other suitable entities. The GCP information can be received in response to information determination, in response to receipt of a request associated with the mapping region (e.g., request to image the mapping region, request to process images associated with the mapping region, etc.), and/or at any other suitable time.

S110 can optionally include setting one or more GCPs (e.g., placing the GCPs within the mapping region(s)) and/or determining the GCP information (e.g., performing a survey to determine the geographic location of each GCP). However, S110 can additionally or alternatively include any other suitable elements performed in any other suitable manner.

2.2 Receiving Images.

Receiving images S120 preferably functions to receive one or more sets of images (e.g., photographs) depicting the mapping region (e.g., images captured as described in U.S. application Ser. No. 15/887,832 filed on 2 Feb. 2018 and titled "System and Methods for Improved Aerial Mapping with Aerial Vehicles", which is hereby incorporated in its entirety by this reference), preferably aerial images of the mapping region but additionally or alternatively any other suitable images. In one example, the images include a set of photographs (e.g., overlapping photos, each depicting a subset of the mapping region) captured by one or more cameras of one or more UAVs.

The images can be received at a computing device (e.g., user device, remote computing system, etc.), one or more aerial vehicles (e.g., aerial vehicle storage module, such as a flash memory module), and/or any other suitable devices. The images can be received from the aerial vehicle(s), computing device, a remote image capture and/or storage system, and/or any other suitable devices. The images can be received in response to image capture, in response to receipt of a request associated with the mapping region (e.g., request to image the mapping region, request to process images associated with the mapping region, etc.), and/or at any other suitable time.

However, S120 can additionally or alternatively include any other suitable elements performed in any suitable manner.

2.3 Determining Spatial Information Associated with the Images.

Determining spatial information associated with the images S130 preferably includes determining camera (and/or aerial vehicle) positions and/or orientations (e.g., camera pose (position and orientation) estimates, camera position estimates, camera orientation estimates), but can additionally or alternatively include locations of imaged elements (e.g., point cloud) and/or any other suitable spatial information. S130 preferably includes receiving spatial information associated with the images S131, and can additionally or alternatively include determining spatial information based on the images S132, and/or include any other suitable elements.

Receiving spatial information associated with the images S131 preferably functions to determine initial estimates (e.g., prior to subsequent refining) of the location and/or spatial arrangement of imaging elements (e.g., cameras) and/or imaged elements associated with the images. S131 preferably includes receiving spatial information determined at the aerial vehicle(s) (e.g., and received from the determining aerial vehicle(s), such as received directly and/or received via an intermediary such as a user device). The spatial information preferably includes camera position and/or orientation determined based on GPS and/or other GNSS (optionally RTK and/or PPK GPS) measurements, and can additionally or alternatively include inertial measurement unit (IMU) measurements (e.g., supplementing GPS measurements using data fusion such as a Kalman filter or extended Kalman filter, used for dead reckoning in the absence of (reliable) GPS measurements, etc.) and/or any other suitable measurements.

In one example, camera position is determined based on GPS measurements (optionally supplemented by barometric altimeter measurements, IMU measurements, etc.) and camera orientation is determined based on IMU measurements (e.g., accelerometer measurements indicative of orientation with respect to gravity, magnetometer and/or gyroscope measurements indicative of lateral orientation, etc.). However, S131 can additionally or alternatively include receiving any other suitable information associated with the images.

Determining spatial information based on the images S132 preferably functions to refine (e.g., increase accuracy and/or precision, correct erroneous information, etc.) the spatial information received in S131, but can additionally or alternatively include determining spatial information independent of the information received in S131, determining spatial information in lieu of S131, and/or determining any other suitable information. The spatial information is preferably determined using one or more structure-from-motion techniques (e.g., determined as described in U.S. application Ser. No. 15/887,832 filed on 2 Feb. 2018 and titled "System and Methods for Improved Aerial Mapping with Aerial Vehicles", which is hereby incorporated in its entirety by this reference; otherwise determined; etc.), but can additionally or alternatively be determined in any other suitable manner. The spatial information can be determined substantially concurrent with image capture (e.g., determined based on the images that have been captured up to a point in time, subsequently re-determined based on additional images captured in the intervening time after the first determination, etc.; determined at the aerial vehicle(s), at one or more computing devices communicatively connected with the aerial vehicle(s) to receive the images and/or spatial information, such as at a user device in radio communication with the aerial vehicle, etc.), determined following image capture (e.g., determined at one or more computing devices, preferably a remote computing system but additionally or alternatively a user device and/or any other suitable device, such as in response to receipt of the captured images, etc.), and/or determined at any other suitable time. The spatial information preferably has an accuracy (and/or precision) smaller (e.g., substantially smaller) than the distance between adjacent GCPs, more preferably an accuracy substantially similar to the GCP location precision and/or accuracy (e.g., between 1 m-20 m, 0.1 m, etc.; within 1 order of magnitude of the GCP location precision and/or accuracy; etc.), but can alternatively have any suitable spatial accuracy and/or precision.

In one example, S132 includes (e.g., as described in U.S. application Ser. No. 15/887,832 filed on 2 Feb. 2018 and titled "System and Methods for Improved Aerial Mapping with Aerial Vehicles", which is hereby incorporated in its entirety by this reference): extracting one or more features from each image, matching features between the images (e.g., determining a set of matches), determining feature positions (e.g., by triangulation) based on the matches, and/or performing a bundle adjustment (e.g., to minimize error, to minimize error constrained by one or more constraints on the determined poses, etc.) based on the feature positions (e.g., thereby determining refined camera pose estimates based on the feature positions). In a specific example, S132 can be performed using one or more neural networks (e.g., CNNs) trained on a GCP or visual marker feature set. However, S132 can additionally or alternatively include determining any other suitable information based on the images, and/or S130 can additionally or alternatively include any other suitable elements performed in any suitable manner.

2.4 Determining GCP Image Locations.

Determining GCP image locations S140 preferably functions to find locations within one or more images associated with (e.g., depicting) a GCP. S140 is preferably performed for a plurality of GCPs (e.g., each GCP in the GCP dataset received in S110, each GCP depicted in one or more of the images received in S120, etc.). Each performance of S140 (e.g., associated with a particular GCP) is preferably performed independently from the other performances (e.g., associated with other GCPs), such as wherein multiple such performances are performed in parallel (e.g., wherein a first set of image locations associated with a first GCP and a second set of image locations associated with a second GCP are determined substantially concurrently and independently), but can alternatively be performed based on other performances (e.g., wherein a first set of image locations associated with a first GCP, and/or information determined based on the first set, can be used to aid in subsequent determination of a second set of image locations associated with a second GCP).

S140 can be performed by one or more computing devices (e.g., remote computing system, user device, etc.) and/or any other suitable devices. S140 is preferably performed by the computing device(s) that perform S110, S120, and/or S130, but can additionally or alternatively be performed by any other suitable devices. S140 is preferably performed after (e.g., in response to) performance of S110, S120, and/or S130 (e.g., after S110 and S130, after S130 has been performed for a particular subset of images, etc.). S140 can be performed in response (e.g., immediately in response) to performance of prior method elements, in response to trigger occurrence (e.g., receiving a request to process GCPs associated with a set of images), and/or at any other suitable time.

Figure 2:
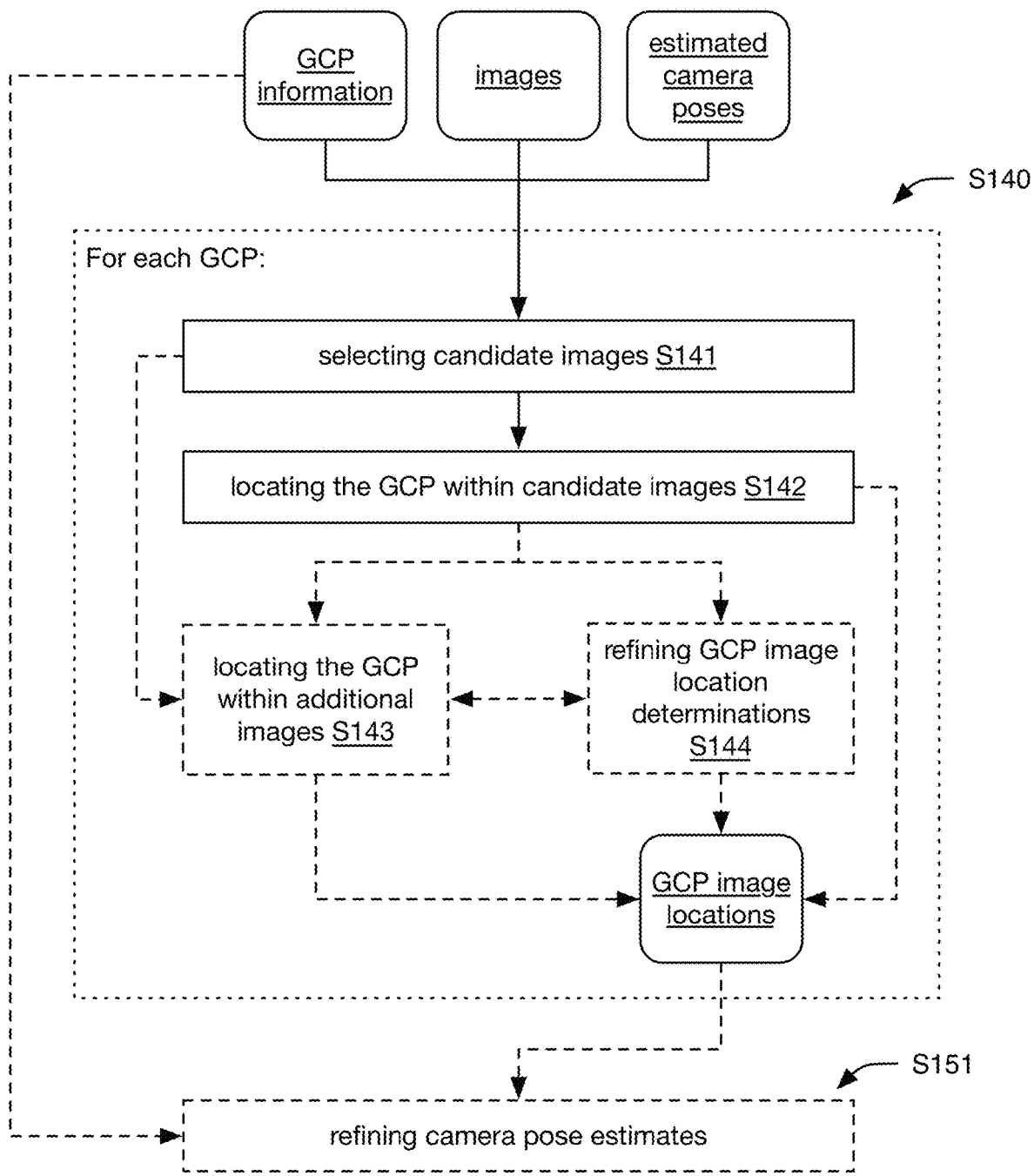
FIG. 2 is a flowchart diagram of an embodiment of determining GCP image locations.

Each performance of S140 preferably includes selecting candidate images S141 and locating the GCP within candidate images S142, and can additionally or alternatively include locating the GCP within additional images S143 and/or refining GCP image location determinations S144 (e.g., as shown in FIG. 2). However, S140 can additionally or alternatively include any other suitable elements performed in any suitable manner.

2.4.1 Selecting Candidate Images.

Selecting candidate images S141 preferably functions to select one or more images from the set of images received in S120. S141 can include selecting a single candidate image or a plurality of candidate images (e.g., 2, 3, 4, 5, 6, 8, 12, 16, 24, 2-4, 4-8, 8-16, 16-32, 32-64, 64-128, or 100-1000 candidate images, etc.). The candidate images are preferably selected based on the spatial information determined in S130, but can additionally or alternatively be selected based on any other suitable information.

The candidate images are preferably images in which the GCP is expected (e.g., based on the image's spatial information) to appear near the center of the image. The GCP can be expected to appear closer to the center than for any other image, and/or expected to appear within a threshold distance of the image center, such as a threshold number of pixels (e.g., 10, 20, 50, 100, 200, 500, 1000, 1-10, 10-30, 30-100, 100-300, 300-1000, or 1000-3000 pixels, etc.), a threshold fraction (e.g., 1, 2, 5, 10, 20, 50, 0.1-1, 1-2, 2-5, 5-10, 10-20, 20-50, or 50-100%, etc.) of an image dimension (e.g., width, height, diagonal length, etc.). The image center is preferably a predetermined pixel coordinate, but can alternatively be a geographic location (e.g., determined based on the image's spatial information, etc.), dynamically determined, or otherwise determined.

Candidate image selection can optionally include use of one or more criteria (e.g., associated with image quality, pose determination quality, etc.) to filter out undesirable images. In a first example, one or more candidate images are selected (e.g., based on distance from the expected GCP location to the image center) only from images for which one or more quality metrics are superior to an associated threshold value (e.g., image noise below a threshold, pose uncertainty below a threshold, pose confidence above a threshold, etc.), wherein the images that do not satisfy one or more criteria are filtered out. In a second example, one or more candidate images are selected (e.g., based on one or more quality metrics) only from images for which the expected GCP location (e.g., the expected location of the GCP representation within the image, such as expected based on the estimated camera pose) is within a threshold distance of the image center. In a third example, one or more candidate images are selected from images having a GCP probability (and/or centered GCP probability) above a predetermined threshold (e.g., determined by a CNN and/or other neural network), wherein the probability threshold can be: 90%, 80%, 75%, 50%, between 30%-100% (e.g., 30-50%, 50-75%, 75-95%, 95-99%, 99-100%, etc.), or any suitable threshold. However, any other suitable criteria can additionally or alternatively be applied.

S141 can optionally include selecting a subset (e.g., a sub-region such as a set of pixels, preferably a contiguous pixel region) of each candidate image (or of one or more, but not all, of the candidate images), preferably a subset expected to depict the GCP (e.g., central subset, subset centered on the expected GCP location, etc.). The subset can be determined based: on the size of the physical region depicted by the image (e.g., wherein a smaller subset is selected for an image depicting a larger physical region, such as to achieve subsets that depict substantially similar physical region sizes); the confidence in the expected GCP location (e.g., wherein a smaller subset is selected for an image associated with a superior confidence level), such as based on the pose determination precision and/or accuracy; and/or any other suitable criteria. However, S141 can additionally or alternatively include selecting candidate images in any other suitable manner.

2.4.2 Locating the GCP within Candidate Images.

Locating the GCP within candidate images S142 preferably functions to determine a GCP image location within each image, such as the pixel or sub-pixel coordinates within the image corresponding to the surveyed point of the GCP (e.g., the center or other reference point of the GCP marker). S142 preferably includes locating the GCP within each candidate image selected in S141, but can alternatively include locating the GCP within only some of the candidate images. If S141 includes selecting a subset of a candidate images, S142 can optionally include locating the GCP within the subset (e.g., rather than within the entire candidate image).

Figure 3:
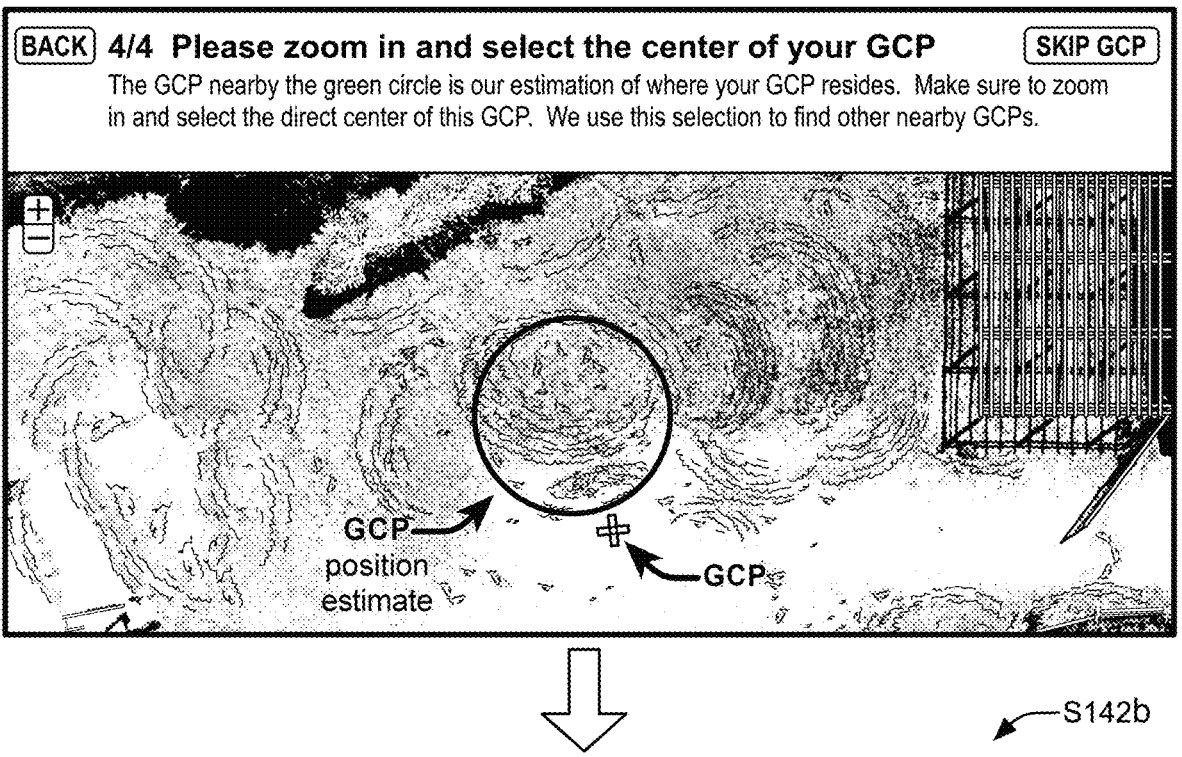
FIG. 3 is an example of locating a GCP within an image.
Figure 3:
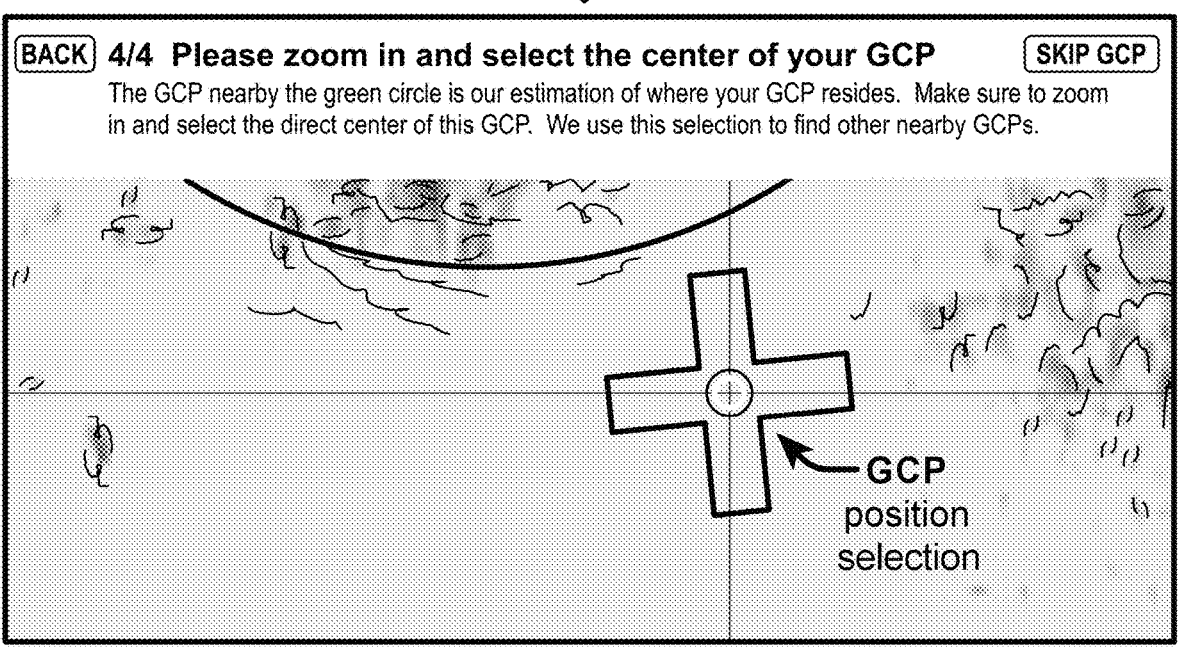

In a first variation, the GCP is located based on user input (e.g., located by a user), such as shown in FIG. 3. This variation preferably includes presenting one or more candidate images to a user S142a and receiving a user selection of a position (e.g., image pixel or sub-pixel) corresponding to the GCP location S142b (e.g., received on and/or relative to the presented image(s)), but can additionally or alternatively include any other suitable elements. S142a can include displaying the candidate image(s) at a computing device such as a user device, and/or presenting the image(s) in any other suitable manner. S142a preferably include presenting only a single candidate image, but can additionally or alternatively include presenting multiple candidate images (e.g., concurrently, sequentially, etc.); allowing the user to request a different candidate image (e.g., if the GCP is not visible in the presented image), and preferably presenting a different image in response, such as displaying the next candidate image or by repeating S141 to select a different candidate image); and/or include presenting any suitable images in any suitable manner. S142a can optionally include presenting only a subset of the candidate image (e.g., displaying only the subset selected in S141). The candidate image can optionally be presented along with an indication of the expected GCP location (e.g., displayed along with a visual element, such as a superimposed circle around the location, a mark at the location, etc.). S142a can optionally include presenting GCP information to the user, such as the additional information associated with the GCP (e.g., as described above regarding S110, such as GCP identifier, type, and/or surroundings, etc.).

In a second variation, the GCP is located automatically (e.g., by a computerized technique). This variation preferably includes detecting GCP image locations S142c. In this variation, GCP image locations are preferably determined for multiple candidate images (e.g., 16 images), but can additionally or alternatively be determined for only a single image and/or for any suitable number of images. This variation can optionally include (e.g., when S142c is performed for multiple candidate images of the GCP): comparing GCP image locations S142d and/or determining a consolidated GCP image location. However, this variation can additionally or alternatively include any other suitable elements performed in any suitable manner.

Detecting GCP image locations S142c preferably functions to attempt to automatically detect a depiction of the GCP within each candidate image (or subset thereof, such as a subset selected in S141). S142c is preferably performed using machine learning and/or computer vision technique(s) (e.g., one or more neural networks, such as a convolutional neural network), preferably trained to recognize depictions of GCPs (e.g., trained during a previous performance of S160). S142c can be performed based on all or some of the additional information associated with the GCP (e.g., GCP type), such as by using a machine learning technique trained to recognize depictions of the particular GCP type. For each candidate image, S142c preferably determines an image location of the GCP (e.g., coordinates within the image) and/or provides an indication that the GCP was not or may not have been detected in the image (e.g., probability that the image location corresponds to the GCP, failure/success indication, etc.).

Figure 5A:
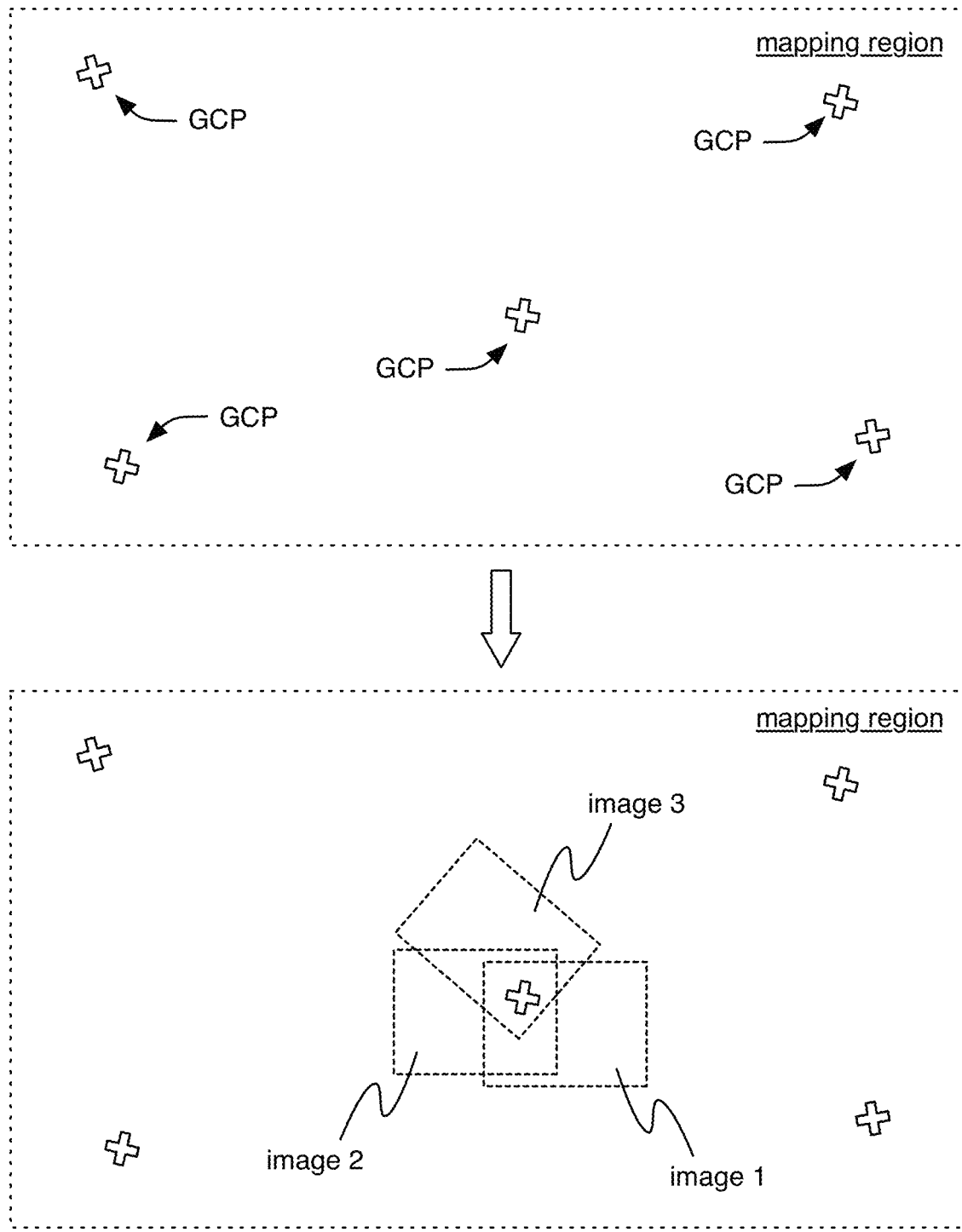
FIGS. 5A-5C depict an example of detecting and comparing GCP image locations.
Figure 5B:
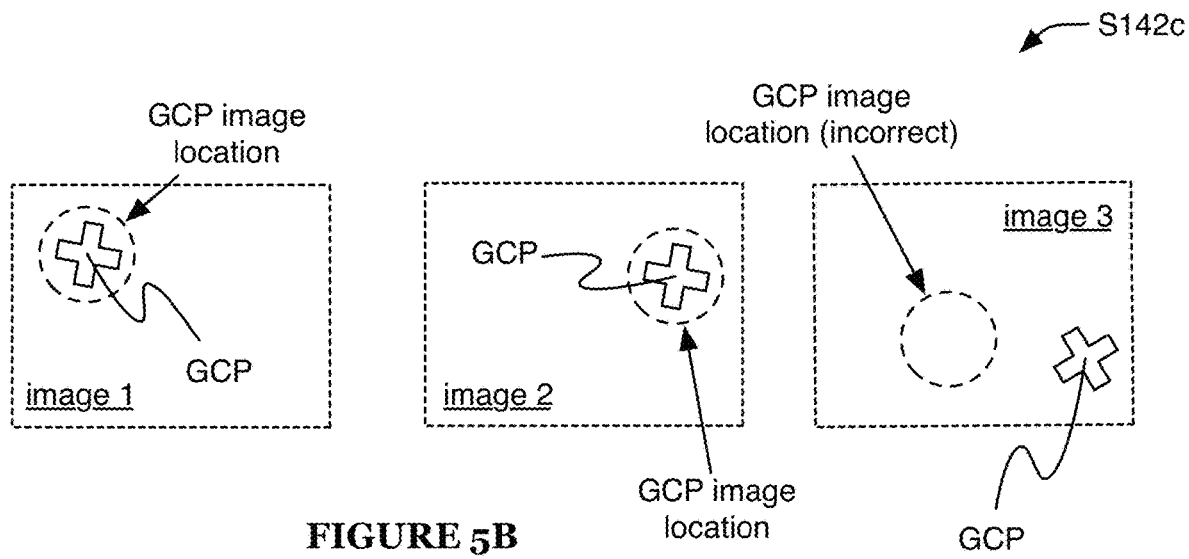
Figure 5C:
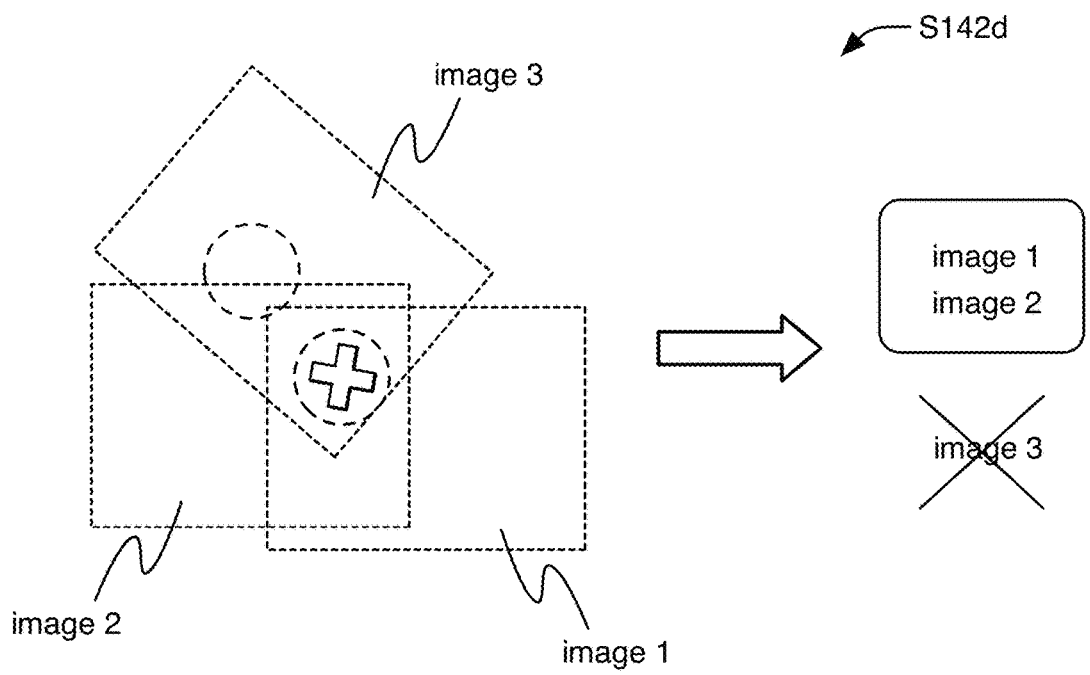
Figure 6:
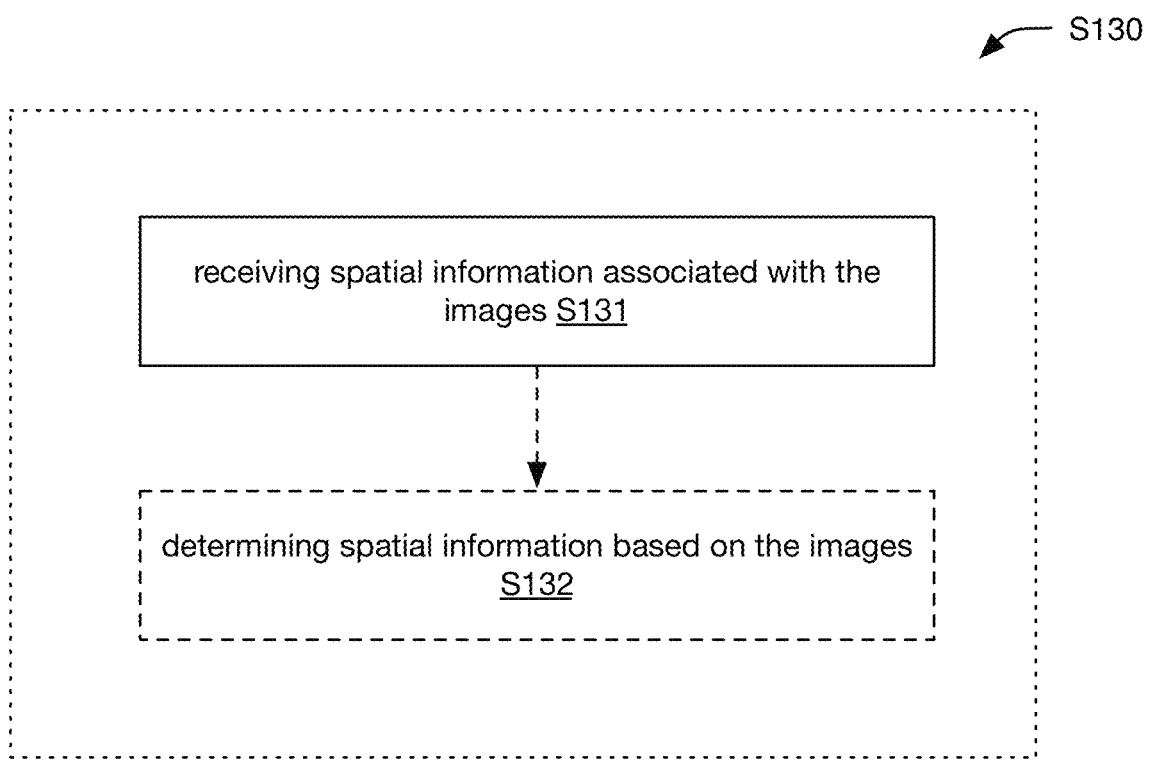
FIG. 6 is a flowchart diagram of an embodiment of determining spatial information associated with the images.

Comparing GCP image locations S142d preferably functions to compare the results of S142c for different images in which the GCP is located, such as to detect (and preferably discard) outlier results based on the comparison (e.g., as shown in FIGS. 5A-5C, wherein the GCP image location of image 3 is determined to be an outlier). S142d preferably includes determining (e.g., based on the GCP image locations and/or the refined or unrefined camera pose estimates) that one or more GCP image locations is (predicted to be) incorrect, wherein the incorrect GCP image locations are not used in subsequent method elements (e.g., not used in S150, such as when refining the camera pose estimates based on the GCP image locations).

S142d can include checking for agreement (e.g., within a threshold distance) between the GCP image locations of multiple images (and/or between a GCP image location of each image and a central image location, such as the consolidated GCP image location described below), and discarding locations outside the threshold. The threshold distance can be a distance within the image, such as number of pixels (e.g., 1, 5, 10, 15, 20, 25, 30, 40, 50, 75, 100, 0.1-3, 3-10, 10-30, 30-100, 100-300, or 300-1000 pixels). For example, agreement between a first and second GCP image location can be determined based on a distance between the first GCP image location within a first image and a projected image location, associated with the second GCP image location, within the first image (e.g., determined based on the second GCP image location within a second image, and based on the camera pose estimates of the first and second images); or agreement between the first GCP image location and the consolidated GCP image location can be determined based on a distance between the first GCP image location and a projected image location, associated with the consolidated GCP image location, within the first image (e.g., determined based on the camera pose estimate of the first image). The threshold distance can additionally or alternatively be a geographic distance (e.g., 0.1, 0.3, 1, 3, 10, 0.01-0.1, 0.1-1, 1-10, or 10-100 m) and/or estimate thereof, such as the geographic distance between implied GCP positions (e.g., the geospatial position implied by the camera pose estimate and the GCP image location of a particular image, which is not necessarily the same as the known GCP location received in S110). For example, the distance can be the geographic distance corresponding to the distance between the first GCP image location and the projected image location described above (e.g., determined based on the estimated camera pose of the first image).

In some examples, S142d includes determining one or more subsets (e.g., clusters, non-exclusive and/or non-exhaustive subsets, etc.) of GCP image locations, selecting one or more of the subsets, and excluding all GCP image locations not in the selected subset(s). In a first example, the cluster with the greatest number of members is selected, such as by partitioning the implied GCP positions into a plurality of subsets using a clustering technique and then selecting a subset of the plurality as a primary subset, wherein the primary subset has a cardinality greater than a cardinality of every other subset of the plurality. In a second example, a subset of GCP image locations associated with the greatest confidence level (e.g., mean, median, minimum, or maximum confidence level associated with each image, overall confidence level associated with the subset, etc.) is selected. In a third example, a subset is selected based on user input (e.g., received in response to requesting input from the user, such as presenting a choice between images, including their associated GCP image location, of different subsets). However, the subsets can additionally or alternatively be determined and/or selected in any other suitable manner.

Determining a consolidated GCP image location preferably functions to determine a single (e.g., central) GCP image location based on the detected GCP image locations and on the associated camera poses (e.g., determined as the median, arithmetic mean, geometric mean, mode, etc.). For example, determining a consolidated GCP image location can include determining a central position (e.g., the consolidated implied GCP position) based on all or some of the GCP image locations (e.g., associated with the primary subset), wherein each implied GCP position of the primary subset is within the threshold distance (e.g., geographic distance) of the central position. However, the consolidated image location can additionally or alternatively be determined in any other suitable manner, and/or S142 can additionally or alternatively include any other suitable elements performed in any suitable manner.

2.4.3 Locating the GCP within Additional Images.

S140 can optionally include locating the GCP within additional images S143, and can function to provide additional information associated with the GCP. S143 is preferably performed after S142 (e.g., in response to completion of S142) and/or concurrent with S142 (e.g., in response to completion of a subset of S142, such as determination of one or more GCP image locations), but can additionally or alternatively be performed at any other suitable time.

The additional images can include images near the candidate images, such as the nearest neighbors of the candidate images (e.g., 8 nearest neighbors), and/or any other images that include, may include, and/or are expected to include the GCP. The additional images can optionally exclude or include some or all of: candidate images, images for which the GCP was not detected in S142c, images associated with outlier GCP image locations discarded in S142d, and/or any other suitable images. The nearest neighbors are preferably defined as the images geographically nearest the candidate image(s) (e.g., images with the most overlap between imaged regions, the closest (estimated) image centers, the closest (estimated) camera positions, etc.), but can additionally or alternatively be closest to the candidate images in vector space (e.g., visual feature vectors) and/or otherwise related to the candidate images. The nearest neighbors are preferably determined based on the estimated camera poses, but can additionally or alternatively be determined based on image analysis and/or any other suitable information.

In one example, S143 includes: detecting and matching features between the images, preferably between the candidate images and additional images (e.g., as described in U.S. application Ser. No. 15/887,832 filed on 2 Feb. 2018 and titled "System and Methods for Improved Aerial Mapping with Aerial Vehicles", which is hereby incorporated in its entirety by this reference); for each image, estimating a change in camera pose (e.g., from a candidate image) based on the matched features (e.g., representing the change as a homography matrix); and mapping the GCP image location from the candidate image(s) (e.g., received in S142) onto the additional images. However, S143 can additionally or alternatively include any other suitable elements performed in any suitable manner.

2.4.4 Refining GCP Image Location Determinations.

Refining GCP image location determinations S144 can function to refine the determinations associated with one or more target images (e.g., the additional images of S143), and is preferably performed based on the GCP image locations, one or more candidate images, the target images, and/or the estimated camera poses. S144 can include performing automated refining S144a, performing user-based refining S144b, and/or refining the GCP image location determinations in any other suitable manner. S144 is preferably performed after (e.g., in response to completion of) S142 and/or S143, but can additionally or alternatively be performed at any other suitable time.

S144a preferably includes selecting an image region (GCP patch) from a candidate image (e.g., around the GCP image location, such as centered on the location), more preferably wherein the image region depicts the GCP. For each target image, S144a preferably includes: warping the GCP patch (e.g., applying a transform, preferably an affine transform) based on the change in camera pose between the images (e.g., generating a transformed patch by applying the affine transform to the image region), such as by applying the homography matrix (e.g., determined in S143); computing a transform (e.g., a spatial filter, such as a Laplacian filter) of the warped patch (e.g., generating a filtered patch by applying a spatial filter to the respective transformed patch); and searching the target image (e.g., searching a subset of the target image around the mapped GCP location) for a match to the transformed patch, wherein the matching location is the refined GCP image location. Searching the target image can be performed using a cross-correlation technique (e.g., CC, NCC, ZNCC, etc.) and/or any other suitable technique. For example, searching the target image can include: based on the patch (e.g., transformed patch, filtered patch, etc.), selecting an image region within the target image using a cross-correlation technique, such as by determining a correlation with the filtered patch (e.g., by performing the same filtering on patches of the target image and/or on the entire target image, by comparing the filtered patch with unfiltered patches of the target image, etc.). However, S114 can additionally or alternatively include any other suitable automated refining techniques.

Figures 4A, 4B:
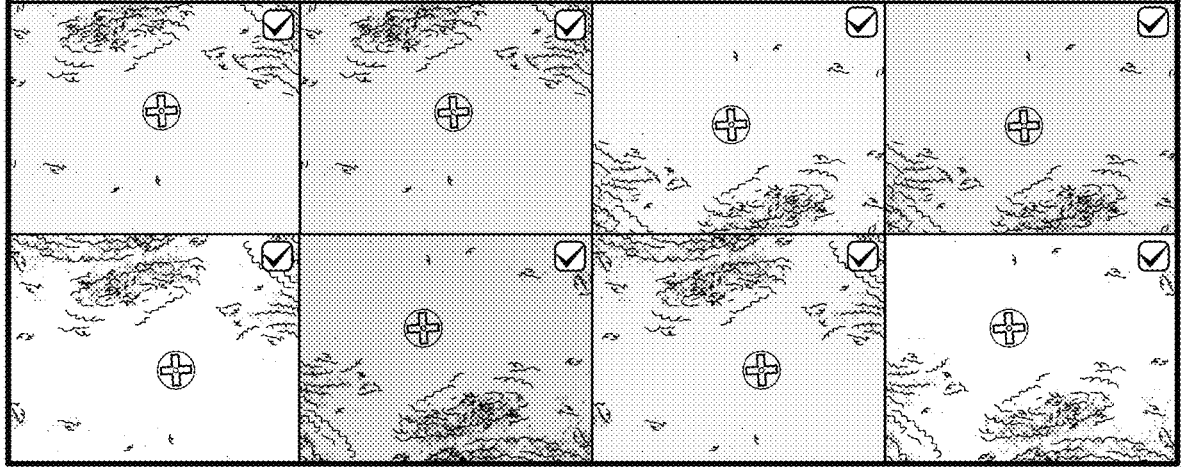
FIGS. 4A-4B are examples of refining GCP image locations.

S144b is preferably performed after (e.g., in response to performance of) S144a, but can additionally or alternatively be performed before S144a, instead of S144a (timed as described above regarding S144a), and/or at any other suitable time. S144b preferably includes presenting one or more images (or subsets thereof, preferably subsets depicting the GCP) to a user, receiving a user input in response, and updating the GCP image location based on the user input (e.g., as shown in FIGS. 4A-4B). Presenting images to the user preferably includes displaying the images. The display preferably includes an indication (e.g., visual indication, such as a cross, dot, circle, etc.) of the GCP image location (e.g., displaying a representation of the GCP image location to the user). S144b preferably includes presenting all images for which the GCP image location was determined (e.g., in S142 and/or S143), preferably excluding outliers determined in S142d, but alternatively including such outliers. The user input can include a selection of a GCP image location, an approval or rejection of the estimated GCP image location, and/or any other suitable input. For example, S144b can include, after displaying the representation of the GCP image location to the user, receiving a confirmation input from the user indicative of GCP representation presence at the GCP image location. However, S144b can include any other suitable user-based refining techniques, and/or S140 can additionally or alternatively include any other suitable elements performed in any suitable manner.

2.5 Determining Aerial Map Information.

The method can optionally include determining aerial map information S150 (e.g., refining camera pose estimates S151), which can function to determine information associated with the mapping region. The aerial map information is preferably determined based on the GCP image locations, images, and/or estimated camera poses. 815o preferably includes refining the camera pose estimates based on the GCP dataset and the GCP image locations (e.g., further refining the refined camera pose estimates that were previously refined in S132, refining unrefined camera pose estimates determined in S131, etc.). The GCP image locations (and/or GCP image location-to-GCP geographic location mapping) are preferably treated as known (e.g., fixed) values, such as when performing bundle adjustments and/or making other aerial map determinations (e.g., to refine estimated camera poses, determine aerial maps and/or analyses thereof, etc., such as described in U.S. application Ser. No. 15/887,832 filed on 2 Feb. 2018 and titled "System and Methods for Improved Aerial Mapping with Aerial Vehicles", which is hereby incorporated in its entirety by this reference; example analyses can include analyses associated with determining photogrammetric measurements, orthomosaic maps such as manipulatable orthomosaic maps, models such as 3D models, meshes, and/or point-clouds, etc.). S150 is preferably performed after (e.g., in response to performance of) S140, but can additionally or alternatively be performed at any other suitable time. However, S150 can additionally or alternatively include any other suitable elements performed in any suitable manner.

2.6 Training an Automated GCP Detector.

The method can optionally include training an automated GCP detector S160, which can function to enable and/or improve performance of method elements such as S142. S160 can include training one or more detectors (e.g., machine learning tool such as a neural network) based on information determined during performance of the method, such as in S142b and/or S144. However, S160 can additionally or alternatively include training any other suitable detectors in any suitable manner, and the method can additionally or alternatively include any other suitable elements performed in any suitable manner.

Although omitted for conciseness, the preferred embodiments include every combination and permutation of the various system components and the various method processes in any suitable order (e.g., in series, in parallel, etc.). Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for ground control point (GCP) mapping, comprising:
    receiving a GCP dataset associated with a mapping region, the GCP dataset comprising a geographic location associated with a GCP;
    receiving a set of images associated with the mapping region, each image of the set associated with a respective camera pose estimate, wherein each camera pose estimate comprises a camera position estimate and a camera orientation estimate;
    selecting a plurality of images of the set, wherein, for each image of the plurality, selecting the image comprises predicting that the image depicts the GCP based on the geographic location and the respective camera pose estimate associated with the image;
    for each image of the plurality, automatically determining a respective GCP image location within the image using a computer vision technique;
    after automatically determining the GCP image locations, determining, based on the GCP image locations and the camera pose estimates, that a first GCP image location is incorrect, comprising:
        for each GCP image location, determining a respective implied GCP position based on the camera pose estimates;
        based on the implied GCP positions, determining a consolidated implied GCP position; and
        determining that a first implied GCP position, associated with the first GCP image location, is not within a threshold distance of the consolidated implied GCP position:
    after determining that the first GCP image location is incorrect, refining the camera pose estimates based on the geographic location and the GCP image locations, wherein refining the camera pose estimates is not performed based on the first GCP image location; and
    after refining the camera pose estimates, generating a representation of the mapping region based on the set of images and the camera pose estimates.

2. The method of claim 1, wherein the representation of the mapping region comprises an orthomosaic map of the mapping region.

3. The method of claim 1, further comprising, before further refining the camera pose estimates based on the geographic location and the GCP image locations:
    displaying a representation of the respective GCP image location to a user; and after displaying the representation of the respective GCP image location to the user, receiving a confirmation input from the user indicative of GCP representation presence at the respective GCP image location.

4. The method of claim 1, wherein the representation of the mapping region comprises an elevation map of the mapping region.

5. The method of claim 1, further comprising, before automatically determining the respective GCP image locations, refining the camera pose estimates based on the set of images.

6. The method of claim 5, wherein refining the camera pose estimates based on the set of images comprises:
 based on a first image of the set of images, determining a set of features, each feature of the set associated with a respective first image subset of the first image, wherein the respective first image subset depicts the feature;
 determining a set of matches, comprising, for each feature of the set, determining a respective second image subset of a second image of the set of images, wherein the respective second image subset depicts the feature;
 based on the set of matches, determining a set of feature positions, comprising, for each feature of the set, determining a respective feature position of the feature within the mapping region; and
 based on the set of feature positions, determining refined camera pose estimates associated with the first and second images.

7. The method of claim 6, wherein refining the camera pose estimates based on the geographic location and the GCP image locations comprises:
 determining a refined set of feature positions based on the geographic location and the GCP image locations; and
 based on the refined set of feature positions, determining further refined camera pose estimates associated with the first and second images.

8. The method of claim 6, wherein determining the set of feature positions comprises:
 based on the set of matches, determining a set of estimated positions; and
 performing a bundle adjustment to refine the set of estimated positions.

9. The method of claim 5, wherein refining the camera pose estimates based on the set of images comprises:
 based on a first image of the set of images, determining a set of features, each feature of the set associated with a respective first image subset of the first image, wherein the respective first image subset depicts the feature;
 determining a set of matches, comprising, for each feature of the set, determining a respective second image subset of a second image of the set of images, wherein the respective second image subset depicts the feature;
 based on the set of matches, determining a set of feature positions, comprising, for each feature of the set, determining a respective feature position of the feature within the mapping region; and
 based on the set of feature positions, determining refined camera pose estimates associated with the first and second images.

10. The method of claim 1, wherein determining the consolidated implied GCP position comprises:
 partitioning the implied GCP positions into a plurality of subsets using a clustering technique; and
 selecting a subset of the plurality as a primary subset, wherein:
  the primary subset has a cardinality greater than a cardinality of every other subset of the plurality; and
  the primary subset does not comprise the first implied GCP position; and
 determining a central position based on the primary subset, wherein:
  each implied GCP position of the primary subset is within the threshold distance of the central position; and
  the consolidated implied GCP position is the central position.

11. The method of claim 1, wherein automatically determining the respective GCP image location within the image using the computer vision technique comprises using a convolutional neural network trained to recognize depictions of GCPs.

12. The method of claim 1, further comprising, before refining the camera pose estimates based on the geographic location and the GCP image locations, for each image of the plurality:
 displaying a representation of the respective GCP image location to a user; and
 after displaying the representation of the respective GCP image location to the user, receiving a confirmation input from the user indicative of GCP representation presence at the respective GCP image location.

* * * * *